US012716024B2

(12) United States Patent
Pecinovsky et al.

(10) Patent No.: US 12,716,024 B2
(45) Date of Patent: Aug. 25, 2026

(54) NON-LINEAR OPTICAL MATERIALS CONTAINING HIGH BOILING POINT SOLVENTS, AND METHODS OF EFFICIENTLY POLING THE SAME

(71) Applicants: Lightwave Logic, Inc., Englewood, CO (US); Polariton Technologies Ltd., Adliswil (CH)

(72) Inventors: Cory Pecinovsky, Lafayette, CO (US); Ginelle A. Ramann, Castle Rock, CO (US); Baoquan Chen, Lone Tree, CO (US); Barry Johnson, Castle Rock, CO (US); Wolfgang Heni, Zurich (CH)

(73) Assignees: Lightwave Logic, Inc., Englewood, CO (US); Polariton Technologies Ltd., Adliswil (CH)

( * ) Notice: Subject to any disclaimer, the term of this patent is extended or adjusted under 35 U.S.C. 154(b) by 718 days.

(21) Appl. No.: 18/072,964

(22) Filed: Dec. 1, 2022

(65) Prior Publication Data

US 2023/0174852 A1 Jun. 8, 2023

Related U.S. Application Data

(60) Provisional application No. 63/264,880, filed on Dec. 3, 2021.

(51) Int. Cl.
*C09K 11/06* (2006.01)
*C09K 11/02* (2006.01)

(52) U.S. Cl.
CPC .............. *C09K 11/06* (2013.01); *C09K 11/02* (2013.01); *C09K 2211/14* (2013.01)

(58) Field of Classification Search
CPC ............................ C09K 11/02; C09K 2211/14
See application file for complete search history.

(56) References Cited

U.S. PATENT DOCUMENTS

| | | | |
|---|---|---|---|
| 4,767,169 | A | 8/1988 | Teng et al. |
| 4,795,664 | A | 1/1989 | Demartino |
| 4,810,338 | A | 3/1989 | Demartino et al. |
| 4,936,645 | A | 6/1990 | Yoon et al. |
| 5,006,285 | A | 4/1991 | Thackara et al. |
| 5,044,725 | A | 9/1991 | Demartino et al. |
| 5,106,211 | A | 4/1992 | Chiang et al. |
| 5,133,037 | A | 7/1992 | Yoon et al. |
| 5,170,461 | A | 12/1992 | Yoon et al. |
| 5,187,234 | A | 2/1993 | Leslie et al. |
| 5,196,509 | A | 3/1993 | Allen |
| 5,247,042 | A | 9/1993 | Allen et al. |
| 5,326,661 | A | 7/1994 | Sansone et al. |
| 5,670,091 | A | 9/1997 | Marder et al. |
| 5,679,763 | A | 10/1997 | Jen et al. |
| 6,090,332 | A | 7/2000 | Marder et al. |
| 6,393,190 | B1 | 5/2002 | He et al. |
| 6,444,830 | B1 | 9/2002 | He et al. |
| 6,448,416 | B1 | 9/2002 | He et al. |
| 6,514,434 | B1 | 2/2003 | He et al. |
| 6,584,266 | B1 | 6/2003 | He et al. |
| 6,716,995 | B2 | 4/2004 | Huang et al. |
| 2005/0173681 | A1 | 8/2005 | Yamaguchi et al. |
| 2007/0260062 | A1 | 11/2007 | Goetz et al. |
| 2007/0260063 | A1 | 11/2007 | Goetz et al. |
| 2008/0009620 | A1 | 1/2008 | Goetz et al. |
| 2008/0139812 | A1 | 6/2008 | Goetz et al. |
| 2009/0005561 | A1 | 1/2009 | Goetz et al. |
| 2012/0267583 | A1 | 10/2012 | Goetz, Jr. et al. |
| 2015/0014607 | A1 | 1/2015 | Kaneko et al. |
| 2016/0349547 | A1 | 12/2016 | Chen et al. |
| 2021/0405504 | A1 | 12/2021 | Pecinovsky et al. |

FOREIGN PATENT DOCUMENTS

| | | | |
|---|---|---|---|
| JP | 2006267736 | A | 10/2006 |
| WO | 0009613 | A2 | 2/2000 |

OTHER PUBLICATIONS

Lee, E.et al., "Coplanar Electrode Polymer Modulators Incorporating Fluorinated Polyimide Backbone Electro-Optic Polymer," Photonics 7, No. 4: 100 (2020).

C. W. Thiel, "For-wave Mixing and Its Applications," www.physics.montana.edu.students.thiel.docs/FWMixing.pdf; (2008).

Chia-Chi Teng, Measuring Electro-Optic Constants of a Poled Film, in Nonlinear Optics of Organic Molecules and Polymers, Chp. 7, 447-49 (Hari Singh Nalwa & Seizo Miyata eds., 1997).

Qiu, F. et al., "A hybrid electro-optic polymer and TiO2 double-slot waveguide modulator," Sci. Rep. 5, 8561 (2015).

Shi, S. and Prather, D., "Ultrabroadband Electro-Optic Modulator Based on Hybrid Silicon-Polymer Dual Vertical Slot Waveguide," Advances in Optoelectronics vol. 2011, Article ID 714895, 6 pages.

Qui, F. et al., "Plate-slot polymer waveguide modulator on silicon-on-insulator," Opt. Express 26, 11213-11221 (2018).

Enami, Y. et al., "Electro-optic polymer/TiO2 multilayer slot waveguide modulators," Applied Physics Letters 101, 123509 (2012).

Liu, et al., Rational enhancement of electro-optic activity: Design and synthesis of cyanoacetate containing nonlinear optical chromophores, 185 Dyes and Pigments, Elsevier Applied Science Publishers Barking 108914 (2021).

(Continued)

*Primary Examiner* — Peter F Godenschwager
(74) *Attorney, Agent, or Firm* — Flaster Greenberg P.C.

(57) ABSTRACT

The present invention is directed, in general, to compositions containing electro-optic materials and high boiling point solvents allowing for improved, more efficient poling, as well as methods of poling such materials. Various embodiments of the present invention thus provide materials with excellent electro-optic properties which can be efficiently poled for use in electro-optic devices. In the various embodiments of the present invention, materials can be applied as thin films and efficiently poled at low temperatures with normally applied voltage, while simultaneously exhibiting excellent nonlinear optical macroscopic properties and thermal stability.

13 Claims, No Drawings

(56) References Cited

OTHER PUBLICATIONS

C. W. Thiel, Four-wave Mixing and Its Applications, Fac. Washington, Wash. D.C. (2008).

Qiu, F. et al., Plate-slot polymer waveguide modulator on silicon-on-insulator, 26 Optics Express 11213-11221 (2018).

NON-LINEAR OPTICAL MATERIALS CONTAINING HIGH BOILING POINT SOLVENTS, AND METHODS OF EFFICIENTLY POLING THE SAME

CROSS-REFERENCE TO RELATED APPLICATIONS

This application claims the benefit of U.S. Provisional Patent Application No. 63/264,880, filed Dec. 3, 2021, the contents of which are incorporated herein by reference in their entirety.

BACKGROUND OF THE INVENTION

Nonlinear optical (NLO) chromophores provide the electro-optic (EO) activity in poled, electro-optic polymer devices. Electro-optic polymers have been investigated for many years as an alternative to inorganic materials such as lithium niobate in electro-optic devices. Electro-optic devices may include, for example, external modulators for telecom, RF photonics, and optical interconnects and so forth. Polymeric electro-optic materials have demonstrated enormous potential for core application in a broad range of next-generation systems and devices, including phased array radar, satellite and fiber telecommunications, cable television (CATV), optical gyroscopes for application in aerial and missile guidance, electronic counter measure (ECM) systems, backplane interconnects for high-speed computation, ultraquick analog-to-digital conversion, land mine detection, radio frequency photonics, spatial light modulation and all-optical (light-switching-light) signal processing.

Many NLO molecules (chromophores) have been synthesized that exhibit high molecular electro-optic properties. The product of the molecular dipole moment ($\mu$) and hyperpolarizability ($\beta$) is often used as a measure of molecular electro-optic performance due to the dipole's involvement in material processing. See Dalton et al., "New Class of High Hyperpolarizability Organic Chromophores adipond Process for Synthesizing the Same", WO 00/09613.

Nevertheless extreme difficulties have been encountered translating microscopic molecular hyperpolarizabilities ($\beta$) into macroscopic material hyperpolarizabilities ($\chi^2$). Molecular subcomponents (chromophores) must be integrated into NLO materials that exhibit (i) a high degree of macroscopic nonlinearity and (ii) sufficient temporal, thermal, chemical and photochemical stability. High electro-optic activity and the stability of electro-optic activity, which is also referred to as "temporal stability," are important for commercially viable devices. Electro-optic activity may be increased in electro-optic polymers by increasing the concentration of nonlinear optical chromophores in a host polymer and by increasing of the electro-optic property of chromophores. However, some techniques for increasing chromophore concentration may decrease poling efficiency and temporal stability. Simultaneous solution of these dual issues is regarded as the final impediment in the broad commercialization of EO polymers in numerous devices and systems.

The production of high material hyperpolarizabilities ($\chi^2$) is limited by the poor social character of NLO chromophores. Commercially viable materials must incorporate chromophores at large molecular densities with the requisite molecular moment statistically oriented along a single material axis. In order to achieve such an organization, the charge transfer (dipole) character of NLO chromophores is commonly exploited through the application of an external electric field during material processing that creates a localized lower-energy condition favoring noncentrosymmetric order. Unfortunately, at even moderate chromophore densities, molecules form multi-molecular dipolarly-bound (centrosymmetric) aggregates that cannot be dismantled via realistic field energies. To overcome this difficulty, integration of anti-social dipolar chromophores into a cooperative material architecture is commonly achieved through the construction of physical barriers (e.g., anti-packing steric groups) that limit proximal intermolecular relations.

Thus, it has often been considered advantageous in the art to produce nonlinear optical chromophore containing materials that exhibit a high glass transition temperature (Tg). Materials with a high glass transition temperature exhibit improved thermal stability and maintain their macroscopic electro-optic properties to a greater degree than materials with lower glass transition temperatures. However, materials with such elevated glass transition temperatures require significantly increased temperatures during poling processes to achieve adequate alignment. The necessity of employing such elevated temperatures is costly, time-consuming and results in what is referred to a poling inefficiency.

BRIEF SUMMARY OF THE INVENTION

The present invention is directed, in general, compositions containing electro-optic materials and high boiling point solvents allowing for improved, more efficient poling, as well as methods of poling such materials. Various embodiments of the present invention thus provide materials with excellent electro-optic properties which can be efficiently poled for use in electro-optic devices. In the various embodiments of the present invention, materials can be applied as thin films and efficiently poled at low temperatures with normally applied voltage, while simultaneously exhibiting excellent nonlinear optical macroscopic properties and thermal stability.

Various embodiments according to the present invention include a composition comprising: (i) an electro-optic material comprised of a nonlinear optical chromophore, wherein the electro-optic material has a glass transition temperature ("$Tg_m$" or "material glass transition temperature") greater than or equal to about 100° C.; and (ii) a solvent having a boiling point greater than or equal to about 100° C.; wherein the solvent is present in an amount such that a glass transition temperature of the composition as a whole ("$Tg_c$" or "composition glass transition temperature") is less than the $Tg_m$.

Various other embodiments according to the present invention include a method comprising: (i) providing a composition comprising an electro-optic material comprised of a nonlinear optical chromophore, the electro-optic material having a glass transition temperature ($Tg_m$) greater than or equal to about 100° C., and a solvent having a boiling point greater than or equal to 100° C., the composition having a glass transition temperature ($Tg_c$) which is less than the $Tg_m$; (ii) preparing a thin film of the composition on a substrate or a device surface; (iii) poling the nonlinear optical chromophore in the thin film; and (iv) removing solvent from the composition while the nonlinear optical chromophore is in the poled state such that an oriented, thermally stable electro-optic thin film is formed.

Various additional embodiments according to the present invention can include such compositions wherein the electro-optic material further comprises a host polymer in which the nonlinear optical chromophore may be dispersed. Various additional embodiments according to the present invention can include or can also include such compositions wherein the electro-optic material include multiple nonlinear optical chromophores and or multiple host polymers. Various additional embodiments according to the present invention can include or can also include electro-optic materials having a material glass transition temperature greater than or equal to 125° C., or greater than or equal to 150° C., or even higher, and can include or also include a solvent having a boiling point greater than or equal to 125° C., or a boiling point greater than or equal to 150° C., or a boiling point greater than or equal to 175° C., or a boiling point greater than or equal to 200° C., or a boiling point greater than or equal to 250° C., or more.

Still further embodiments according to the present invention include thin films prepared using compositions or methods according to the foregoing embodiments, as well as electro-optic devices containing such thin films.

Other aspects, features and advantages will be apparent from the following disclosure, including the detailed description, preferred embodiments, and the appended claims.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a polymer" or "the polymer" herein or in the appended claims can refer to a single polymer or more than one polymer. As a further example, reference to "a solvent" or "the solvent" herein or in the appended claims can refer to a single solvent or a mixture of more than one solvent. Additionally, all numerical values, unless otherwise specifically noted, are understood to be modified by the word "about."

As used herein, the term "nonlinear optic chromophore" (NLOC) refers to molecules or portions of a molecule that create a nonlinear optic effect when irradiated with light. The chromophores are any molecular unit whose interaction with light gives rise to the nonlinear optical effect. The desired effect may occur at resonant or nonresonant wavelengths. The activity of a specific chromophore in a nonlinear optic material is stated as its hyper-polarizability, which is directly related to the molecular dipole moment of the chromophore. The various embodiments of NLO chromophores of the present invention are useful structures for the production of NLO effects.

The first-order hyperpolarizability (β) is one of the most common and useful NLO properties. Higher-order hyperpolarizabilities are useful in other applications such as all-optical (light-switching-light) applications. To determine if a material, such as a compound or polymer, includes a nonlinear optic chromophore with first-order hyperpolar character and a sufficient electro-optic coefficient ($r_{33}$), which is a function of β, the following test may be performed. First, the material in the form of a thin film is placed in an electric field to align the dipoles. This may be performed by sandwiching a film of the material between electrodes, such as indium tin oxide (ITO) substrates, gold films, or silver films, for example.

To generate a poling electric field, an electric potential is then applied to the electrodes while the material is heated to near its glass transition ($T_g$) temperature. After a suitable period of time, the temperature is gradually lowered while maintaining the poling electric field. Alternatively, the material can be poled by corona poling method, where an electrically charged needle at a suitable distance from the material film provides the poling electric field. In either instance, the dipoles in the material tend to align with the field.

The nonlinear optical property of the poled material is then tested as follows. Polarized light, often from a laser, is passed through the poled material, then through a polarizing filter, and to a light intensity detector. If the intensity of light received at the detector changes as the electric potential applied to the electrodes is varied, the material incorporates a nonlinear optic chromophore having an electro-optically variable refractive index. A more detailed discussion of techniques to measure the electro-optic constants of a poled film that incorporates nonlinear optic chromophores may be found in Chia-Chi Teng, Measuring Electro-Optic Constants of a Poled Film, in Nonlinear Optics of Organic Molecules and Polymers, Chp. 7, 447-49 (Hari Singh Nalwa & Seizo Miyata eds., 1997), incorporated by reference in its entirety, except that in the event of any inconsistent disclosure or definition from the present application, the disclosure or definition herein shall be deemed to prevail.

The relationship between the change in applied electric potential versus the change in the refractive index of the material may be represented as its EO coefficient $r_{33}$. This effect is commonly referred to as an electro-optic, or EO, effect. Devices that include materials that change their refractive index in response to changes in an applied electric potential are called electro-optical (EO) devices.

The second-order hyperpolarizability (γ) or third-order susceptibility ($\chi^{(3)}$), are the normal measures of third-order NLO activity. While there are several methods used to measure these properties, degenerate four-wave mixing (DFWM) is very common. See C. W. Thiel, "For-wave Mixing and Its Applications," http://www.physics.montana.edu.students.thiel.docs/FWMixing.pdf, the entire contents of which are hereby incorporated herein by reference. Referring to Published U.S. Patent Application No. US 2012/0267583A1, the entire contents of which are incorporated herein by reference, a method of evaluating third-order NLO properties of thin films, known in the art as Degenerate Four Wave Mixing (DFWM), can be used. In FIG. 4 of US 2012/0267583A1, Beams 1 and 2 are picosecond, coherent pulses, absorbed by the NLO film deposited on a glass substrate. Beam 3 is a weaker, slightly delayed beam at the same wavelength as Beams 1 and 2. Beam 4 is the resulting product of the wave mixing, diffracted off of the transient holographic grating, produced by interferences of beams 1 and 2 in the NLO material of the film. Beam 3 can be a "control" beam at a telecom wavelength which produces a "signal" beam at a frequency not absorbed by the NLO material.

Compositions suitable for use in the various embodiments according to the present invention include an electro-optic material and a solvent having a boiling point greater than or equal to 100° C. Electro-optic materials suitable for use include at least one nonlinear optical chromophore and may further include a host polymer.

Nonlinear optical chromophores suitable for use in accordance with the various embodiments of the invention include those having the general formula (I):

$$D - \Pi - A \tag{I}$$

wherein D represents an organic electron-donating group; A represents an organic electron-accepting group having an electron affinity greater than the electron affinity of D; and Π represents a Π-bridge between A and D. The terms electron-donating group (donor or "D"), Π-bridge (bridging group or "Π"), and electron-accepting group (acceptor or "A"), and general synthetic methods for forming D-Π-A chromophores are known in the art, for example as described in U.S. Pat. Nos. 5,670,091, 5,679,763, 6,090,332, and 6,716,995, and U.S. patent application Ser. No. 17/358,960, filed on Jun. 25, 2021, the entire contents of each of which is incorporated herein by reference.

An acceptor is an atom or group of atoms that has a low reduction potential, wherein the atom or group of atoms can accept electrons from a donor through a Π-bridge. The acceptor (A) has a higher electron affinity that does the donor (D), so that, at least in the absence of an external electric field, the chromophore is generally polarized in the ground state, with relatively more electron density on the acceptor (D). Typically, an acceptor group contains at least one electronegative heteroatom that is part of a pi bond (a double or triple bond) such that a resonance structure can be drawn that moves the electron pair of the pi bond to the heteroatom and concomitantly decreases the multiplicity of the pi bond (i.e., a double bond is formally converted to single bond or a triple bond is formally converted to a double bond) so that the heteroatom gains formal negative charge. The heteroatom may be part of a heterocyclic ring. Exemplary acceptor groups include but are not limited to $—NO_2$, —CN, —CHO, COR, $CO_2R$, $—PO(OR)_3$, —SOR, $—SO_2R$, and $—SO_3R$ where R is alkyl, aryl, or heteroaryl. The total number of heteroatoms and carbons in an acceptor group is about 30, and the acceptor group may be substituted further with alkyl, aryl, and/or heteroaryl.

Suitable electron-accepting groups "A" (also referred to in the literature as electron-withdrawing groups) for nonlinear optical chromophores that can be used in accordance with the various embodiments of the present invention include those described in published U.S. Patent Applications: US 2007/0260062; US 2007/0260063; US 2008/0009620; US 2008/0139812; US 2009/0005561; US 2012/0267583A1 (collectively referred to as "the prior publications"), each of which is incorporated herein by reference in its entirety; and in U.S. Pat. Nos. 6,584,266; 6,393,190; 6,448,416; 6,44,830; 6,514,434; 5,044,725; 4,795,664; 5,247,042; 5,196,509; 4,810,338; 4,936,645; 4,767,169; 5,326,661; 5,187,234; 5,170,461; 5,133,037; 5,106,211; and 5,006,285; each of which is also incorporated herein by reference in its entirety.

In nonlinear optical chromophores suitable for use in accordance with various embodiments of the present invention, suitable electron-accepting groups can include those according to general formula ($I^a$):

($I^a$)

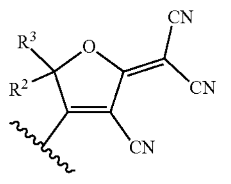

wherein $R^2$ and $R^3$ each independently represents a moiety selected from the group consisting of H, substituted or unsubstituted $C_1$-$C_{10}$ alkyl, substituted or unsubstituted $C_2$-$C_{10}$ alkenyl, substituted or unsubstituted $C_2$-$C_{10}$ alkynyl, substituted or unsubstituted aryl, substituted or unsubstituted alkylaryl, substituted or unsubstituted carbocyclic, substituted or unsubstituted heterocyclic, substituted or unsubstituted cyclohexyl, and $(CH_2)_n$—O—$(CH_2)_n$ where n is 1-10. As used herein,

represents a point of bonding to another portion of a larger molecular structure. In various preferred embodiments, one or both of $R^2$ and $R^3$ represent a halogen-substituted moiety. Halogen-substituted may refer to mono-, di-, tri- and higher degrees of substitution. In various embodiments, one of $R^2$ and $R^3$ represent a halogen-substituted alkyl moiety and the other represents an aromatic moiety. In various embodiments, one of $R^2$ and $R^3$ represent a halogen-substituted aromatic moiety and the other represents an alkyl moiety. In various embodiments, the electron-accepting group can be

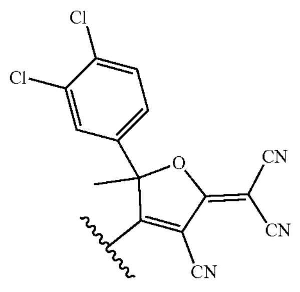 [SMILES: *C1=C(C#N)C(=C(C#N)C#N)OC1(C)c1ccc(Cl)c(Cl)c1]

In various embodiments, the electron-accepting group can be

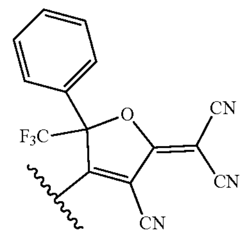 [SMILES: *C1=C(C#N)C(=C(C#N)C#N)OC1(c1ccccc1)C(F)(F)F]

In various embodiments, the electron-accepting group can be

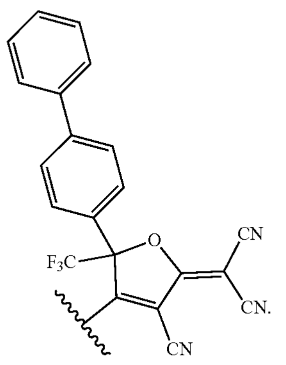 [SMILES: *C1=C(C#N)C(=C(C#N)C#N)OC1(c1ccc(-c2ccccc2)cc1)C(F)(F)F]

A donor includes an atom or group of atoms that has a low oxidation potential, wherein the atom or group of atoms can donate electrons to an acceptor "A" through a Π-bridge. The donor (D) has a lower electron affinity that does the acceptor (A), so that, at least in the absence of an external electric field, the chromophore is generally polarized, with relatively less electron density on the donor (D). Typically, a donor group contains at least one heteroatom that has a lone pair of electrons capable of being in conjugation with the p-orbitals of an atom directly attached to the heteroatom such that a resonance structure can be drawn that moves the lone pair of electrons into a bond with the p-orbital of the atom directly attached to the heteroatom to formally increase the multiplicity of the bond between the heteroatom and the atom directly attached to the heteroatom (i.e., a single bond is formally converted to double bond, or a double bond is formally converted to a triple bond) so that the heteroatom gains formal positive charge. The p-orbitals of the atom directly attached to the heteroatom may be vacant or part of a multiple bond to another atom other than the heteroatom. The heteroatom may be a substituent of an atom that has pi bonds or may be in a heterocyclic ring. Exemplary donor groups include but are not limited to $R_2N$— and, $R_nX^1$—, where R is alkyl, aryl or heteroaryl, $X^1$ is O, S, P, Se, or Te, and n is 1 or 2. The total number of heteroatoms and carbons in a donor group may be about 30, and the donor group may be substituted further with alkyl, aryl, or heteroaryl.

Suitable electron-donating groups "D" for nonlinear optical chromophores that can be used in accordance with the various embodiments of the present invention include those described in published U.S. Patent Applications: US 2007/0260062; US 2007/0260063; US 2008/0009620; US 2008/0139812; US 2009/0005561; US 2012/0267583A1 (collectively referred to as "the prior publications"), each of which is incorporated herein by reference in its entirety; and in U.S. Pat. Nos. 6,584,266; 6,393,190; 6,448,416; 6,44,830; 6,514,434; 5,044,725; 4,795,664; 5,247,042; 5,196,509; 4,810,338; 4,936,645; 4,767,169; 5,326,661; 5,187,234; 5,170,461; 5,133,037; 5,106,211; and 5,006,285; as well as U.S. patent application Ser. No. 17/358,960, filed on Jun. 25, 2021; each of which is also incorporated herein by reference in its entirety.

In various embodiments, the electron-donating groups can include quinolinyl groups which may be substituted or unsubstituted, including hydro and alkyl substituents, aryl substituents and combinations thereof. Such quinolinyl groups may have one or more diamondoid groups covalently attached thereto. For example, the electron-donating groups can include alkoxyphenyl substituted quinolones such as, for example:

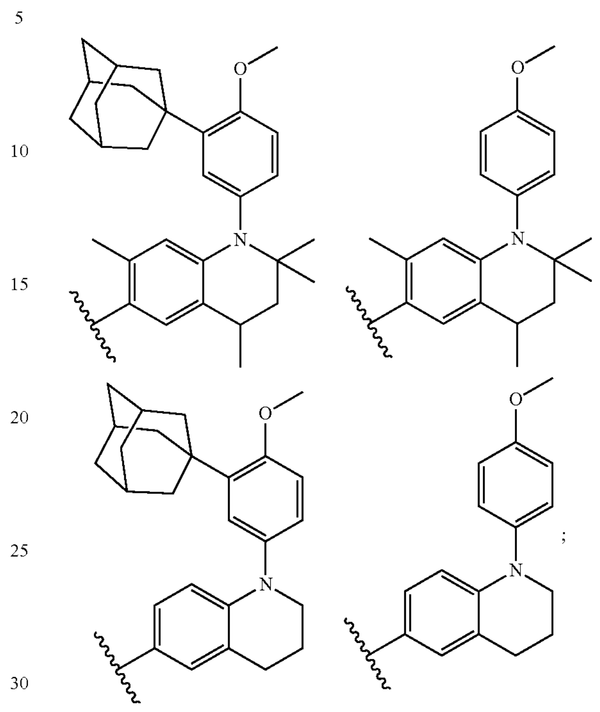

or for example, aromatic nitrogen containing groups such as:

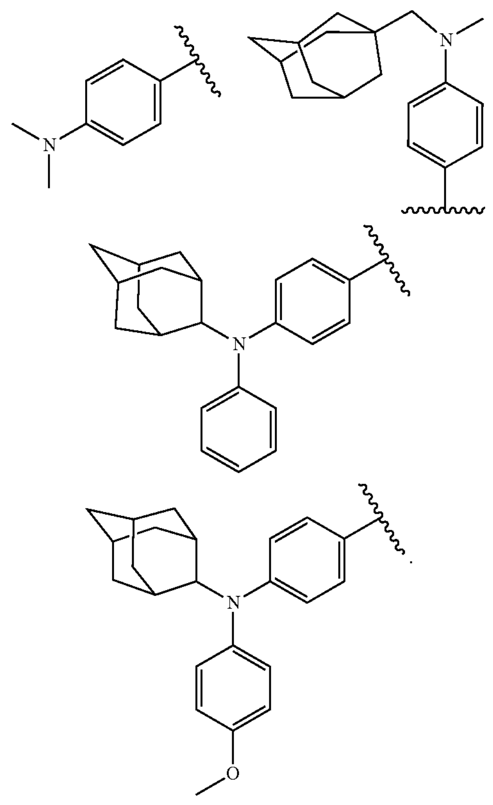

A "Π-bridge" includes an atom or group of atoms through which electrons may be delocalized from an electron donor (defined above) to an electron acceptor (defined above) through the orbitals of atoms in the bridge. Such groups are very well known in the art. Typically, the orbitals will be p-orbitals on double ($sp^2$) or triple (sp) bonded carbon atoms such as those found in alkenes, alkynes, neutral or charged aromatic rings, and neutral or charged heteroaromatic ring systems. Additionally, the orbitals may be p-orbitals on atoms such as boron or nitrogen. Additionally, the orbitals may be p, d or f organometallic orbitals or hybrid organometallic orbitals. The atoms of the bridge that contain the orbitals through which the electrons are delocalized are referred to here as the "critical atoms." The number of critical atoms in a bridge may be a number from 1 to about 30. The critical atoms may be substituted with an organic or inorganic group. The substituent may be selected with a view to improving the solubility of the chromophore in a polymer matrix, to enhancing the stability of the chromophore, or for other purpose.

Suitable bridging groups (Π) for nonlinear optical chromophores according to general formula (I) can include those described in U.S. Pat. Nos. 6,584,266; 6,393,190; 6,448,416; 6,44,830; 6,514,434; each of which is also incorporated herein by reference in its entirety.

In various embodiments, bridging groups (Π) for nonlinear optical chromophores according to general formula (I) can include those of the general formula ($II^a$):

($II^a$)

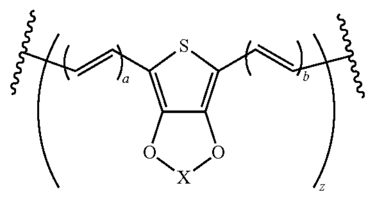

wherein X represents a substituted or unsubstituted, branched or unbranched $C_2$-$C_4$ diyl moiety; wherein each a and b independently represents an integer of 0 to 3; and z represents an integer of 1 to 3. In various embodiments wherein a or b in general formula ($II^a$) is 1, that carbon-carbon double bond in the formula can be replaced with a carbon-carbon triple bond. Alternatively, in various embodiments, bridging groups (Π) for nonlinear optical chromophores according to general formula (I) can include those of the general formula ($II^b$):

($II^b$)

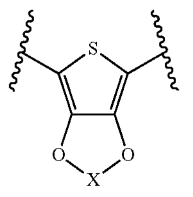

wherein X represents a substituted or unsubstituted, branched or unbranched $C_2$-$C_4$ diyl moiety. In various embodiments wherein one or more diamondoid groups is covalently attached to a bridging group according to general formulae $II^a$ or $II^b$, the one or more diamondoid groups may be bound, for example, to the sulfur or oxygen atoms of the thiophene group or to one or mor carbon atoms in X through an ether or thioether linkage.

In various embodiments, bridging groups (Π) for nonlinear optical chromophores according to general formula (I) can include those of the general formula ($II^c$):

($II^c$)

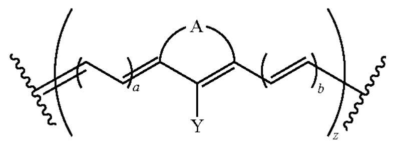

wherein each Y independently represents: a diamondoid-containing group covalently bound to the bridging group through any of the various linkages described herein below including but not limited to ether and thioether linkages; or each Y may represent a hydrogen, an alkyl group, aryl group, sulfur or oxygen linked alkyl or aryl group, or a branched or unbranched, optionally heteroatom-containing $C_1$-$C_4$ substituent; wherein each a and b independently represents an integer of 0 to 3; z represents an integer of 1 to 3; and wherein each arc A independently represents a substituted or unsubstituted $C_2$-$C_4$ alkyl group, which together with the carbon bearing the Y substituent and its two adjacent carbon atoms forms a cyclic group. Substituted or unsubstituted $C_2$-$C_4$ alkyl groups which constitute arc A may include 1 to 4 hydrogen substituents each comprising a moiety selected from the group consisting of substituted or unsubstituted $C_1$-$C_{10}$ alkyl, substituted or unsubstituted $C_2$-$C_{10}$ alkenyl, substituted or unsubstituted $C_2$-$C_{10}$ alkynyl, substituted or unsubstituted aryl, substituted or unsubstituted alkylaryl, substituted or unsubstituted carbocyclic, substituted or unsubstituted heterocyclic, substituted or unsubstituted cyclohexyl, and $(CH_2)_n$—O—$(CH_2)_n$ where n is 1-10. In various embodiments, z represents 1. In various embodiments, the electron-donating group or electron-accepting group can include one or more covalently bound diamondoid groups, and Y in general formula $II^c$ may represent any of the above substituents. In various embodiments, a chromophore may include an electron-donating group including one or more covalently linked diamondoid groups, preferably adamantyl, and the bridging group may include an isophorone group in accordance with general formula $II^c$ wherein Y represent an aryl thioether substituent.

In various embodiments, bridging groups (Π) for nonlinear optical chromophores according to general formula (I) can include those of the general formula ($II^d$):

($II^d$)

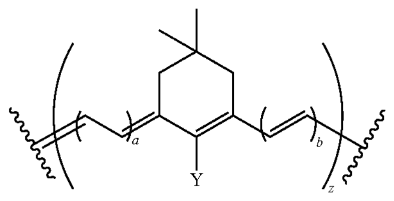

wherein each Y independently represents: a diamondoid-containing group covalently bound to the bridging group through any of the various linkages described herein below including but not limited to ether and thioether linkages; or each Y may represent a hydrogen, an alkyl group, aryl group, sulfur or oxygen linked alkyl or aryl group, an aryl group (optionally bearing a diamondoid group) linked directly by a carbon-carbon bond (e.g., adamantly anisole), a halogen, a halogenated alkyl group, a halogenated aryl group, or a branched or unbranched, optionally heteroatom-containing $C_1$-$C_4$ substituent; wherein each a and b independently represents an integer of 0 to 3; and z represents an integer of 1 to 3. In various embodiments, the electron-donating group or electron-accepting group can include one or more covalently bound diamondoid groups, and Y in general formula $II^d$ may represent any of the above substituents. In various embodiments, a chromophore may include an electron-donating group including one or more covalently linked diamondoid groups, preferably adamantyl, and the bridging group may include an isophorone group in accordance with general formula $II^d$ wherein Y represent an aryl thioether substituent. In various embodiments, each of the geminal methyl groups on the isophorone bridge of the general formula $II^d$ can instead independently represent a moiety selected from the group consisting of substituted or unsubstituted $C_1$-$C_{10}$ alkyl, substituted or unsubstituted $C_2$-$C_{10}$ alkenyl, substituted or unsubstituted $C_2$-$C_{10}$ alkynyl, substituted or unsubstituted aryl, substituted or unsubstituted alkylaryl, substituted or unsubstituted carbocyclic, substituted or unsubstituted heterocyclic, substituted or unsubstituted cyclohexyl, halogens, halogenated alkyl groups (e.g., $—CF_3$), halogenated aryls and heteroaryl groups (e.g., pentafluorothiophenol), and $(CH_2)_n—O—(CH_2)_n$ where n is 1-10.

For example, bridging groups (Π) for nonlinear optical chromophores according to general formula (I) can include:

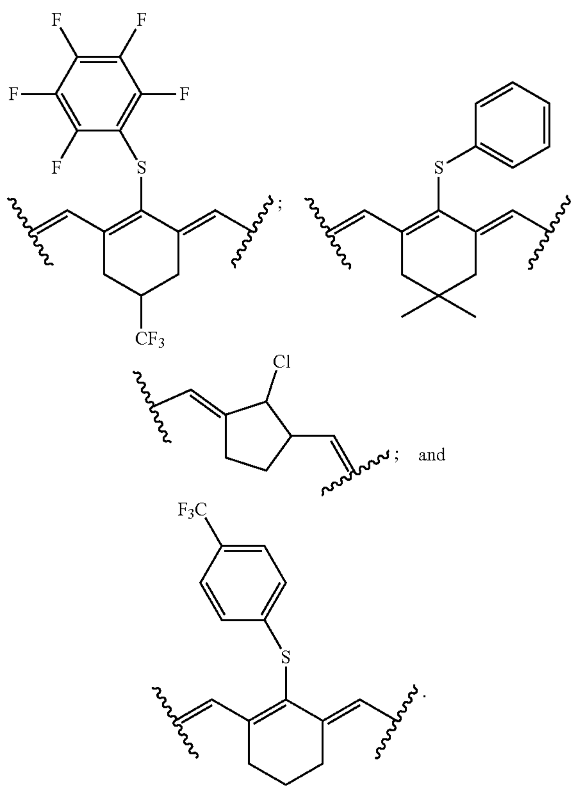

Examples of chromophores suitable for use in accordance with various embodiments can include in addition to all chromophores disclosed in the references incorporated herein by reference, the following:

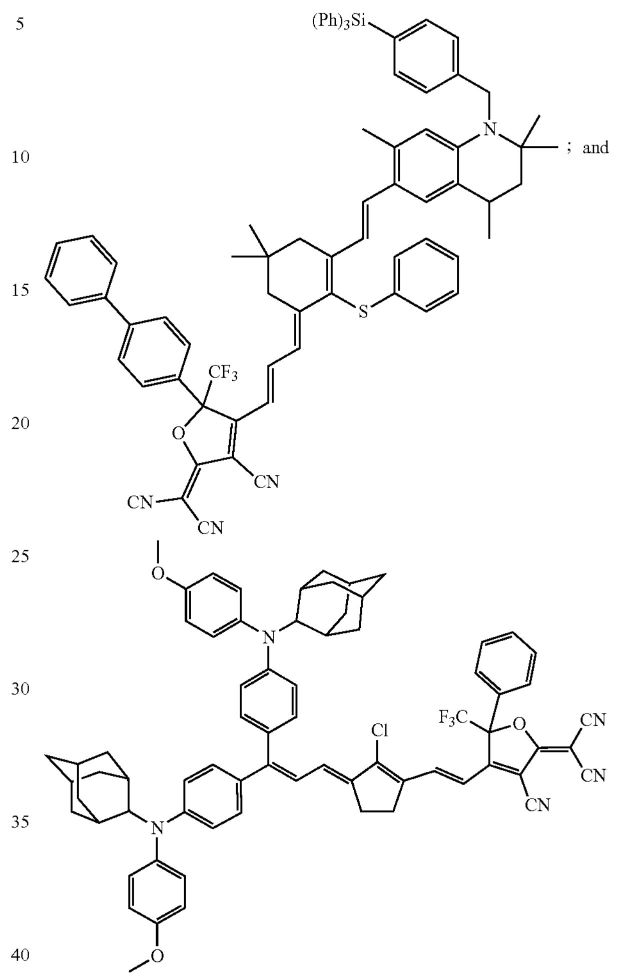

The compositions according to various embodiments of the present invention may further include a host polymer, also referred to as a matrix material, in which the one or more nonlinear optical chromophore(s) may be incorporated. Suitable matrix materials can include polymers, such as, for example: poly(methylmethacrylate)s (PMMA); polyimides; polyamic acid; polystyrenes; poly(urethane)s (PU); and amorphous polycarbonates (APC). In various embodiments the matrix material can comprise a poly(methylmethacrylate), for example having a molecular weight of about 120,000 and a glass transition temperature Tg of about 100-165° C., or an APC having a Tg of about 150-220° C.

The nonlinear optical chromophore can generally be incorporated within the matrix material in virtually any amount, or can be used with no matrix material (i.e., "neat" or 100% chromophore). For example, suitable electro-optic materials can comprise a nonlinear optical chromophore in an amount of from about 1% to 90% by weight, based on the entire weight of combined nonlinear optical chromophores and matrix materials. In various embodiments, suitable electro-optic materials can comprise a nonlinear optical chromophore in an amount of from about 2% to 80% by weight, based on the entire weight of combined nonlinear optical chromophores and matrix materials. In various embodiments, suitable electro-optic materials can comprise a nonlinear optical chromophore in an amount of from about 3% to 75% by weight, based on the entire weight of combined nonlinear optical chromophores and matrix materials. For example, one or more chromophores can be combined with an amorphous polycarbonate or mixtures of matrix materials at 70 wt % chromophore(s)/30 wt % matrix material(s). In various embodiments, chromophores can be crosslinked with matrix materials or other polymers.

Solvents which are suitable for use in the various embodiments according to the present invention include high boiling point solvents. As used herein, "high boiling point solvents" refers to solvents having a boiling point greater than or equal to 100° C. (at 1 atm). In various embodiments, suitable solvents have a boiling point greater than or equal to 110° C., greater than or equal to 120° C., greater than or equal to 130° C., greater than or equal to 140° C., greater than or equal to 150° C., greater than or equal to 160° C., greater than or equal to 170° C., greater than or equal to 180° C., greater than or equal to 190° C., greater than or equal to 200° C., greater than or equal to 210° C., greater than or equal to 220° C., greater than or equal to 230° C., greater than or equal to 240° C., and greater than or equal to 250° C. Solvents which are suitable for use in the various embodiments according to the present invention are capable of lowering the composition glass transition temperature ($Tg_c$) to a value lower than the material glass transition temperature ($Tg_m$), when added to the material to form an inventive composition. In various embodiments, suitable solvents are capable of lowering the composition glass transition temperature ($Tg_c$) to a value at least 10° C. lower than the material glass transition temperature ($Tg_m$), when added to the material to form an inventive composition. In various embodiments, suitable solvents are capable of lowering the composition glass transition temperature ($Tg_c$) to a value at least 20° C. lower than the material glass transition temperature ($Tg_m$), at least 30° C. lower than the material glass transition temperature ($Tg_m$), at least 40° C. lower than the material glass transition temperature ($Tg_m$), and at least 50° C. lower than the material glass transition temperature ($Tg_m$), when added to the material to form an inventive composition.

Suitable solvents for use in the various embodiments are capable of forming a homogenous solution of the electro-optic material, and generally can include high boiling point, relatively nonpolar, aprotic solvents. Suitable solvents include, for example, N-methylpyrrolidone, dimethylsulfoxide, carbonates such as ethylene carbonate and propylene carbonate, and glycol ethers such as diethylene glycol dibutyl ether. Solvents considered "polar," such as DMSO, can be used and considered relatively nonpolar to the extent they can dissolve both polar and nonpolar solutes. In various embodiments, a suitable high boiling point solvent can include diethylene glycol dibutyl ether. In various embodiments, a high boiling point solvent can be used in admixture with a co-solvent that does not have a high boiling point.

An electro-optic material can be dispersed in a suitable solvent in virtually any amount that provides a homogenous solution and suitable properties for thin film formation. For example, the solids content of an electro-optic material in a solvent according to various embodiments described herein can be adjusted depending upon desired film thickness and spin speed of a spin coating apparatus. As known in the art, a less viscous solution generally results in a thinner spin coated film. In various embodiments, the solids content of an electro-optic material in a solvent can be from about 1% to about 25%. In various embodiments, the solids content of an electro-optic material in a solvent can be from about 2% to about 20%. In various embodiments, the solids content of an electro-optic material in a solvent can be from about 5% to about 15%.

Methods in accordance with various embodiments of the present invention include providing a composition as described herein, forming a thin film comprising the composition, poling the thin film, and drying the film (i.e., removing solvent).

A suitable thin film can be formed on a substrate using, for example a spin-coating process or ink jet printing. Suitable substrates can include indium-tin-oxide (ITO) coated surfaces, conductive materials, silicon, semi-conductors and the like. Thin films can be formed at various thicknesses from submicron to several microns. Prior to poling, thin films can be soft-baked, for example, at 60° C. for about a minute.

Thin films prepared in accordance with various method embodiments disclosed herein can be poled by applying a suitable voltage across the material at a suitable temperature. Electrodes can be formed or positioned on opposing sides of a thin film, or above and below a thin film in various devices and structures and a suitable voltage applied across the thin film in such a manner. Electrodes can be formed from, for example, gold. Suitable voltages can be from about 50 V/μm to about 150 V/μm. Suitable temperatures for poling the thin film are generally less than the composition glass transition temperature, but high enough to allow arrangement of the nonlinear optical chromophore within the material. Accordingly for example, where the composition glass transition temperature is 125° C., suitable poling temperatures can include from about 100° C. to just below about 125° C.

After poling the thin film, while still maintaining the field of applied voltage, a thin film in accordance with various embodiments described herein can be dried or densified by removing the remaining solvent. Solvent is generally removed until the glass transition temperature of the thin film approaches the $Tg_m$. Drying or removal of the solvent can be undertaken, for example, by slowly and slightly increasing temperature while the poling field is maintained until solvent is removed, then cooling. Drying or removal of the solvent can be undertaken, for example, by cooling while maintaining the applied poling field to a lower temperature such that de-poling does not occur at a substantial rate and then applying vacuum to remove solvent.

Thin films in accordance with the various embodiments herein can be incorporated in various devices including electro-optic devices having open-top or coplanar designs, and devices having permeable layers, opening or the like such that solvent can be driven off after poling. Examples of open top devices are described in the art, including the following references, the contents of which are hereby incorporated by reference in their entirety: Qiu, F. et al., "A hybrid electro-optic polymer and TiO2 double-slot waveguide modulator," Sci. Rep. 5, 8561 (2015); Shi, S. and Prather, D., "Ultrabroadband Electro-Optic Modulator Based on Hybrid Silicon-Polymer Dual Vertical Slot Waveguide," Advances in Optoelectronics Volume 2011, Article ID 714895, 6 pages; Qui, F. et al., "Plate-slot polymer waveguide modulator on silicon-on-insulator," OPT. EXPRESS 26, 11213-11221 (2018); Enami, Y. et al., "Electro-optic polymer/TiO2 multilayer slot waveguide modulators," Applied Physics Letters 101, 123509 (2012); and Lee, E. et al., "Coplanar Electrode Polymer Modulators Incorporating Fluorinated Polyimide Backbone Electro-Optic Polymer," PHOTONICS 7, no. 4:100 (2020).

The invention will now be described in further detail with reference to the following non-limiting example.

EXAMPLES

Composition Example 1

The nonliner optical chromophore shown below was added at 70 wt. % to an amorphous polycarbonate (APC 180) to form an electro-optic material.

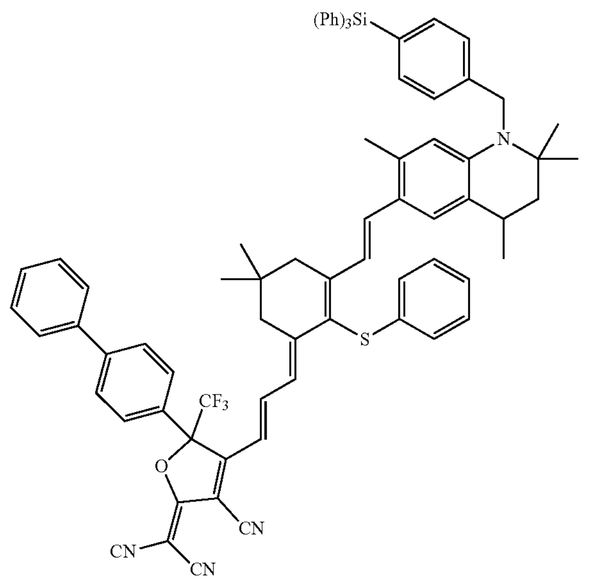

The electro-optic material was combined with an 80:20 mixture of dibromomethane: diethylene glycol dibutyl ether as a solvent. The composition was spin coated on ITO-coated glass and baked under nitrogen at 60° C. for 1 minutes.

Composition Example 2

The nonliner optical chromophore shown below was added at 70 wt. % to an amorphous polycarbonate (APC 180) to form an electro-optic material.

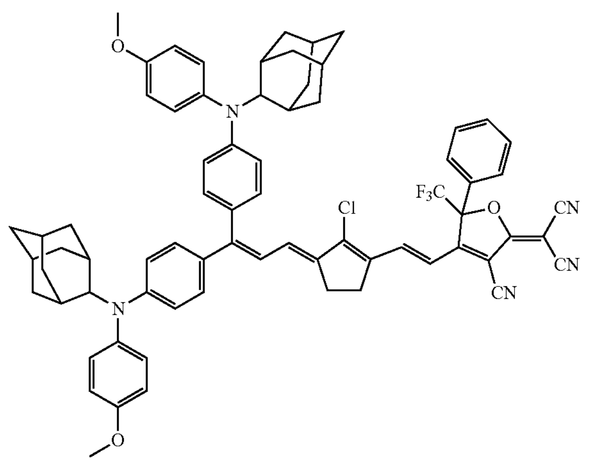 [SMILES: COc1ccc(N(c2ccc(C(=C/C=C3\CCC(/C=C/C4=C(C#N)C(=C(C#N)C#N)OC4(c4ccccc4)C(F)(F)F)=C3Cl)c3ccc(N(c4ccc(OC)cc4)C4C5CC6CC(C5)CC4C6)cc3)cc2)C2C3CC4CC(C3)CC2C4)cc1]

The electro-optic material was combined with an 80:20 mixture of dibromomethane: diethylene glycol dibutyl ether as a solvent. The composition was spin coated on ITO-coated glass and baked under nitrogen at 60° C. for 1 minutes.

Comparative Composition Example 1

The nonliner optical chromophore used in Composition Example 1 was similarly added at 70 wt. % to APC 180 to form an electro-optic material. The electro-optic material was combined with dibromomethane as a solvent. The composition was spin coated on ITO-coated glass and baked under nitrogen at 150° C. for 30 minutes.

Comparative Composition Example 2

The nonliner optical chromophore used in Composition Example 2 was similarly added at 70 wt. % to APC 180 to form an electro-optic material. The electro-optic material was combined with dibromomethane as a solvent. The composition was spin coated on ITO-coated glass and baked under nitrogen at 150° C. for 30 minutes.

The thin films prepared from each of the examples and comparative examples were poled and their r33 value at 1310 nm was measured. The results are set forth below in Table 1.

TABLE 1

| | Poling Temperature | Poling Voltage (V/μm) | r33 @ 1310 nm (pm/V) | r33 @ 1550 nm (pm/V) |
|---|---|---|---|---|
| Composition Example 1 | 120° C. | 67 | 252 | 151 |
| Comparative Example 1 | 170° C. | 58 | 110 | 89 |
| Composition Example 2 | 120° C. | 55 | 237 | 127 |
| Comparative Example 2 | 165° C. | 61 | 180 | 92 |

As shown in Table 1, the poling temperature for thin films prepared from both Composition Examples 1 and 2 were significantly lower than the poling temperature for thin films prepared from Comparative Composition Examples 1 and 2. Moreover, r33 values at 1310 nm were significantly higher for the inventive examples.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A composition comprising:

an electro-optic material comprised of a nonlinear optical chromophore, wherein the nonlinear optical chromophore has a general formula (I):

$$D\text{-}\Pi\text{-}A \quad (I)$$

wherein D represents an organic electron-donating group; A represents an organic electron-accepting group having an electron affinity greater than the electron affinity of D; and Π represents a Π-bridge between A and D;

wherein the organic electron-donating group is a substituted or unsubstituted tetrahydroquinoline group; and wherein the electro-optic material having a glass transition temperature ($Tg_m$) greater than or equal to about 100° C.; and the composition further comprises a solvent having a boiling point greater than or equal to about 100° C.;

wherein the solvent is present in an amount such that a glass transition temperature of the composition as a whole ($Tg_c$) is less than the $Tg_m$.

2. The composition according to claim 1, wherein the electro-optic material further comprises a host polymer in which the nonlinear optical chromophore is dispersed.

3. The composition according to claim 2, wherein the host polymer comprises an amorphous polycarbonate.

4. The composition according to claim 2, wherein the host polymer comprises an amorphous polycarbonate, wherein the solvent comprises diethylene glycol dibutyl ether, and wherein the $Tg_m$ is greater than or equal to 150° C.

5. The composition according to claim 1, wherein the electro-optic material has a glass transition temperature ($Tg_m$) greater than or equal to about 150° C.

6. The composition according to claim 1, wherein the electro-optic material has a glass transition temperature ($Tg_m$) greater than or equal to about 180° C.

7. The composition according to claim 1, wherein the solvent has a boiling point greater than or equal to about 150° C.

8. The composition according to claim 1, wherein the solvent has a boiling point greater than or equal to about 250° C.

9. The composition according to claim 1, wherein the glass transition temperature of the composition as a whole ($Tg_c$) is at least 10° C. lower than the $Tg_m$.

10. The composition according to claim 1, wherein the glass transition temperature of the composition as a whole ($Tg_c$) is at least 25° C. lower than the $Tg_m$.

11. The composition according to claim 1, wherein the glass transition temperature of the composition as a whole ($Tg_c$) is at least 50° C. lower than the $Tg_m$.

12. The composition according to claim 1, wherein the solvent comprises diethylene glycol dibutyl ether.

13. A composition comprising:

an electro-optic material comprised of a nonlinear optical chromophore, the electro-optic material having a glass transition temperature ($Tg_m$) greater than or equal to about 100° C.; and a solvent selected from a group consisting of N-methylpyrrolidone, diethylene glycol dibutyl ether, and a carbonate;

wherein the solvent is present in an amount such that a glass transition temperature of the composition as a whole ($Tg_c$) is less than the $Tg_m$.

* * * * *